US006188186B1

(12) United States Patent
Kong et al.

(10) Patent No.: US 6,188,186 B1
(45) Date of Patent: Feb. 13, 2001

(54) MAGNETOSTRICTION OSCILLATOR DRIVING CIRCUIT AND METHOD

(75) Inventors: Jung-Sil Kong, Kyungsangbuk-Do; Yong-Rae Roh, Daegu-Shi, both of (KR)

(73) Assignee: Jobang Electronics Co., Ltd. (KR)

( * ) Notice: Under 35 U.S.C. 154(b), the term of this patent shall be extended for 0 days.

(21) Appl. No.: 09/416,503

(22) Filed: Oct. 8, 1999

(30) Foreign Application Priority Data

Jan. 30, 1999 (KR) .................................................. 99-3033

(51) Int. Cl.[7] ...................................................... H02N 2/00

(52) U.S. Cl. ............................ 318/118; 114/119; 114/126

(58) Field of Search ..................................... 318/114, 118, 318/119, 126, 128, 130; 134/1, 18, 34, 184

(56) References Cited

U.S. PATENT DOCUMENTS 3,633,424 1/1972 Lynnworth et al. .
5,013,982 * 5/1991 Sasaki .................................. 318/114
5,038,305 8/1991 Kumar et al. .
5,895,997 * 4/1999 Puskas et al. ........................ 310/316

* cited by examiner

*Primary Examiner*—Nestor Ramirez
*Assistant Examiner*—Judson H. Jones
(74) *Attorney, Agent, or Firm*—Zarley, McKee, Thomte, Voorhees & Sease

(57) ABSTRACT

A circuit and method for driving a magnetostriction oscillator which is used for generating a high output ultrasonic wave by using a pulse width modulation is provided. In the circuit, a controller outputs first and second variable digital signals in order to control a duty cycle of a magnetostriction oscillator. A pulse width modulating circuit generates a variable pulse width modulating signal based on the first and second variable digital signals from the controller. A driver drives the magnetostriction oscillator according to the variable pulse width modulating signal from the pulse width modulating circuit. According to the circuit, the system operates for a long time so that stability of equipment can be obtained. The circuit uses low voltage and low energy so that efficiency of the system is promoted.

8 Claims, 8 Drawing Sheets

MAGNETOSTRICTION OSCILLATOR DRIVING CIRCUIT AND METHOD

BACKGROUND OF THE INVENTION

SUMMARY OF THE INVENTION

1. Field of the Invention

The present invention relates to a magnetostriction oscillator which is used for generating a high output ultrasonic wave, more particularly, to a circuit and a method for driving a magnetostriction oscillator by using a pulse width modulation.

2. Prior Art

Generally, a method which removes or prevents scales in heat exchange equipment is performed by washing a pipe by means of a strong acid, or by using an ultrasonic wave generated by means of a magnetostriction oscillator.

An impulse voltage of a high voltage is alternately supplied to each of a pair of magnetostriction oscillators. This removes scales or prevents a generation thereof by an ultrasonic vibration by emitting an ultrasonic wave generated by each magnetostriction oscillator to an inner wall of a pipe in the heat exchanger equipment.

U.S. Pat. No. 3,633,424 issued to Lawrence W. Lynnworth et al. on Jan. 11, 1972 discloses a magnetostriction ultrasonic transducer in which the number of unwanted pulses due to internal reflections is minimized.

FIG. 1 is a circuitry diagram for showing a conventional magnetostriction oscillator driver.

The conventional magnetostriction oscillator driver includes first and second diodes D1 and D2, first and second capacitors C1 and C2, and first and second silicon controlled rectifiers SCR1 and SCR2. When an alternating current voltage AC is applied to first and second diodes D1 and D2, the first and second diodes D1 and D2 perform half-wave rectification of the AC for half cycle by forward and reverse directions. The first and second silicon controlled rectifiers SCR1 and SCR2 alternately perform switching operations so that a predetermined distributed voltage is supplied to first and second magnetostriction oscillators M1 and M2. A resistor R3, a zener diode D3, and a diode D5 are connected to a gate of the first silicon controlled rectifier SCR1 in series. The resistor R3, zener diode D3, and diode D5 serve to switch the first silicon controlled rectifier SCR1. A resistor R4, a zener diode D4, and a diode D6 are connected to a gate of the second silicon controlled rectifier SCR2 in series. The resistor R3, zener diode D3, and diode D5 serve to switch the second silicon controlled rectifier SCR2.

A resistor R5 and a capacitor C4 are connected to an anode of the diode D5 and generate a switching signal according to a time constant thereof. A resistor R6 and a capacitor C5 are connected to an anode of the diode D6 and generate a switching signal according to a time constant thereof. A capacitor C3 is connected between the first and second silicon controlled rectifiers SCR1 and SCR2 and serves to form the predetermined distributed voltage. Resistors R1 and R2 are connected to the capacitors C1 and C2 in parallel, respectively.

An operation of the conventional magnetostriction oscillator driver will now be described.

When an alternating current voltage AC is applied to the first diode D1 through a fuse F for half cycle by a forward direction, the first diode D1 performs half-wave rectification of the AC and outputs a half-wave rectified voltage. The half-wave rectified voltage from the first diode D1 is smoothed by a capacitor C1 and a resistor R1, and the smoothed voltage is supplied to a resistor R5 and a capacitor C4 through a first magnetostriction oscillator M1 to thereby charge the capacitor C4.

When a predetermined time according to a time constant formed by the resistor R5 and capacitor C4 elapses, the capacitor C4 discharges the charged voltage through a path formed between the capacitor C4 and a diode D5. When the discharge voltage is higher than a predetermined voltage, the zener diode D3 triggers a gate of the first silicon controlled rectifiers SCR1 through a resistor R3. Accordingly, the smoothed voltage from the capacitor C1 defines a closed circuit through a capacitor C3 by the switching of the first silicon controlled rectifiers SCR1. At this time, since the capacitor C1 and C3 are connected in parallel to each other, excessive current flows through the first magnetostriction oscillator M1 by the parallel capacitances of the capacitors C1 and C3. Accordingly, an impulse of a high voltage is generated in the first magnetostriction oscillator Ml so that the first magnetostriction oscillator Ml oscillates an ultrasonic signal.

On the other hand, when the alternating current voltage AC is applied to the second diode D2 through a fuse F for half cycle by a reverse direction, the second diode D2 performs half-wave rectification of the AC and outputs a half-wave rectified voltage. The half-wave rectified voltage from the second diode D2 is smoothed by a capacitor C2 and a resistor R2, and the smoothed voltage is supplied to a resistor R6 and a capacitor C5 through the charged capacitor C3 to thereby charge the capacitor C5.

When a predetermined time according to a time constant formed by the resistor R5 and capacitor C4 elapses, the capacitor C5 discharges the charged voltage through a path formed between the capacitor C5 and a diode D6. When the discharge voltage is higher than a predetermined voltage, the zener diode D4 triggers a gate of the second silicon controlled rectifiers SCR2 through a resistor R4. Accordingly, the voltage charged in capacitors C2 and C3 is discharged into the second magnetostriction oscillator M2. The discharged voltage, that is, an impulse of a high voltage operates the second magnetostriction oscillator M2.

As described previously, when a high voltage is alternately applied to first and second magnetostriction oscillators M1 and M2 according to half cycles by forward and reverse directions of the AC power, first and second magnetostriction oscillators M1 and M2 vibrate to generate an ultrasonic signal of a predetermined frequency. Such an ultrasonic signal is used for removing scales or preventing generation thereof.

In the conventional magnetostriction oscillator driver, a high voltage of 1000 volts is used. This means that output efficiency of an ultrasonic wave is lower than input power so that power for operating a system is wasted. An increase of noise due to non-resonant vibrations of magnetostriction oscillator and peripheral circuits thereof according to an impulse of high voltage causes fatigue fracture so that the system cannot be used for a long time. In order to operate the system, two magnetostriction oscillators should be alternately used. Thus, when something is wrong with either one of the two, the system cannot operate.

SUMMARY OF THE INVENTION

Therefore, it is an object of the present invention, for the purpose of solving the above mentioned problems, to provide a magnetostriction oscillator driving circuit and method capable of generating an ultrasonic wave of a high output by low voltage driving and low consumption power by using a pulse width modulating method.

In order to attain the object, according to the present invention, there is provided a magnetostriction oscillator driving circuit, said circuit comprising:

a controller for outputting first and second variable digital signals in order to control a duty cycle of a magnetostriction oscillator;

a pulse width modulating circuit for generating a variable pulse width modulating signal based on the first and second variable digital signals from the controller; and a driver for driving the magnetostriction oscillator according to the variable pulse width modulating signal from the pulse width modulating circuit.

Preferably, the pulse width modulating circuit include first and second digital/analog converters for converting the first and second variable digital signals from the controller into first and second variable analog direct current voltages, respectively; a triangle waveform generator for generating a triangle waveform signal according to a level of the first variable analog direct current voltage from the first digital/analog converter; and a duty cycle controller for outputting the variable pulse width modulating signal based on the second variable analog direct current voltage and the triangle waveform signal from the second digital/analog converter and the triangle waveform generator, respectively. More preferably, the duty cycle controller includes an operational amplifier for amplifying the second variable analog direct voltage from the second digital/analog converter to output an amplified signal, and a comparator for comparing the triangle waveform signal from the triangle waveform generator with the amplified signal from the operational amplifier to output the variable pulse width modulating signal as a comparison result signal.

There is also provided a magnetostriction oscillator driving method, said method the steps of:

(i) supplying a bias current to a magnetostriction oscillator to magnetically saturate the magnetostriction oscillator;

(ii) supplying control data for a pulse width modulation to the magnetically saturated magnetostriction oscillator;

(iii) outputting a variable pulse width modulating signal based on the control data supplied in step (ii);

(iv) judging whether the pulse width of the variable pulse width modulating signal is identical with a reference pulse width; and (v) controlling stopping of the magnetostriction oscillator according to the judgement result of step (iv).

According to the present invention, the system operate for a long time so that stability of equipment can be obtains The present invention uses low voltage and low energy so that efficiency of the system is promoted.

Other objects and further features of the present invent will become apparent from the detailed description when read in conjunction with the attached drawings.

BRIEF DESCRIPTION OF THE DRAWINGS

Other features and advantages of the present invention ill become more apparent from the following description taken in connection with the accompanying drawings, wherein:

FIGS. 5A through 7C are timing charts for illustrating an operation of the magnetostriction oscillator driving circuit shown in FIG. 2.

DETAILED DESCRIPTION OF THE PREFERRED EMBODIMENT

The preferred embodiment of the present invention will hereinafter be described in detail with reference to the accompanying drawings.

Figure 1:
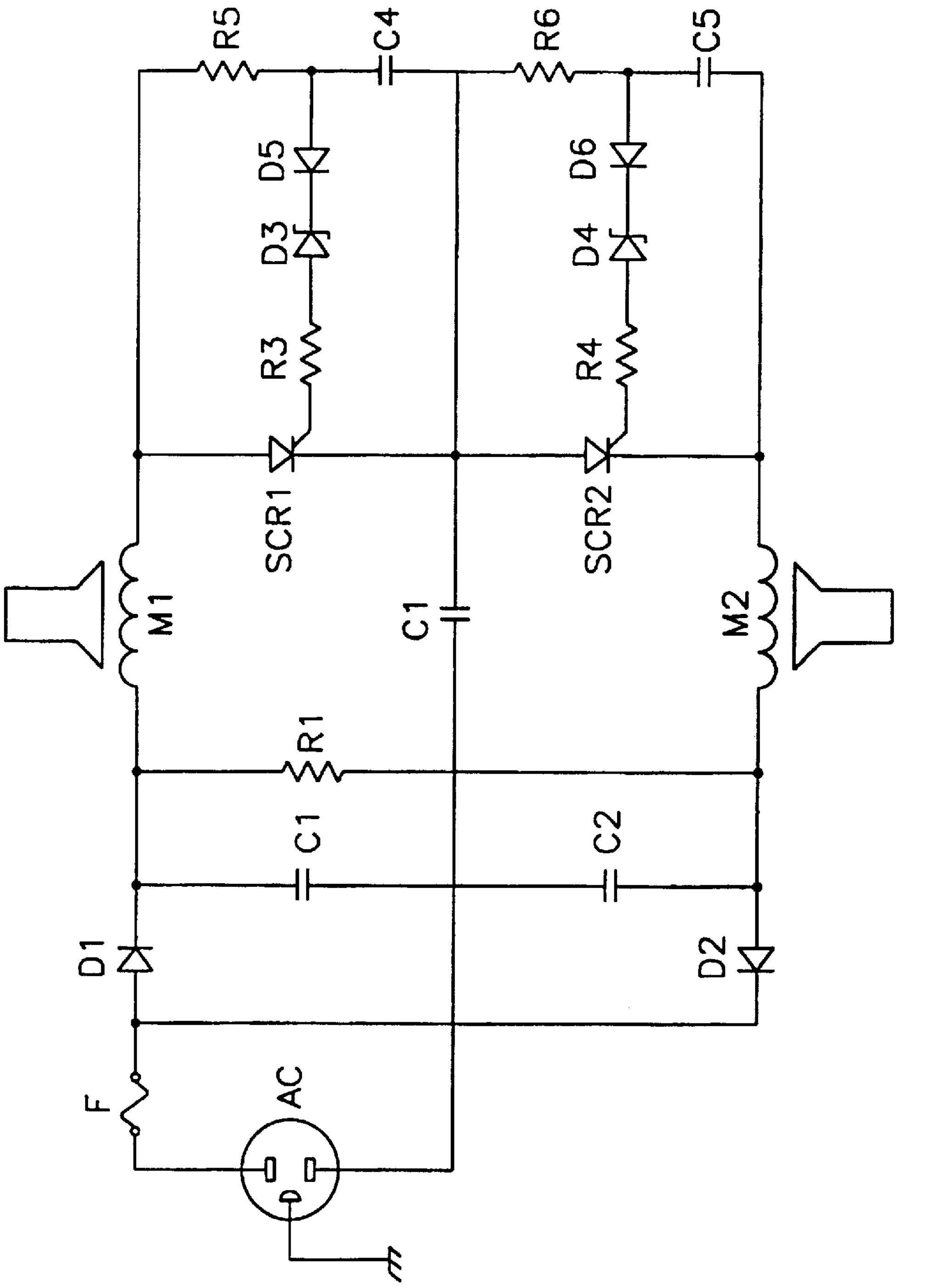
FIG. 1 (PRIOR ART)
FIG. 1 is a circuitry diagram for showing a configuration of a magnetostriction oscillator driver.
Figure 2:
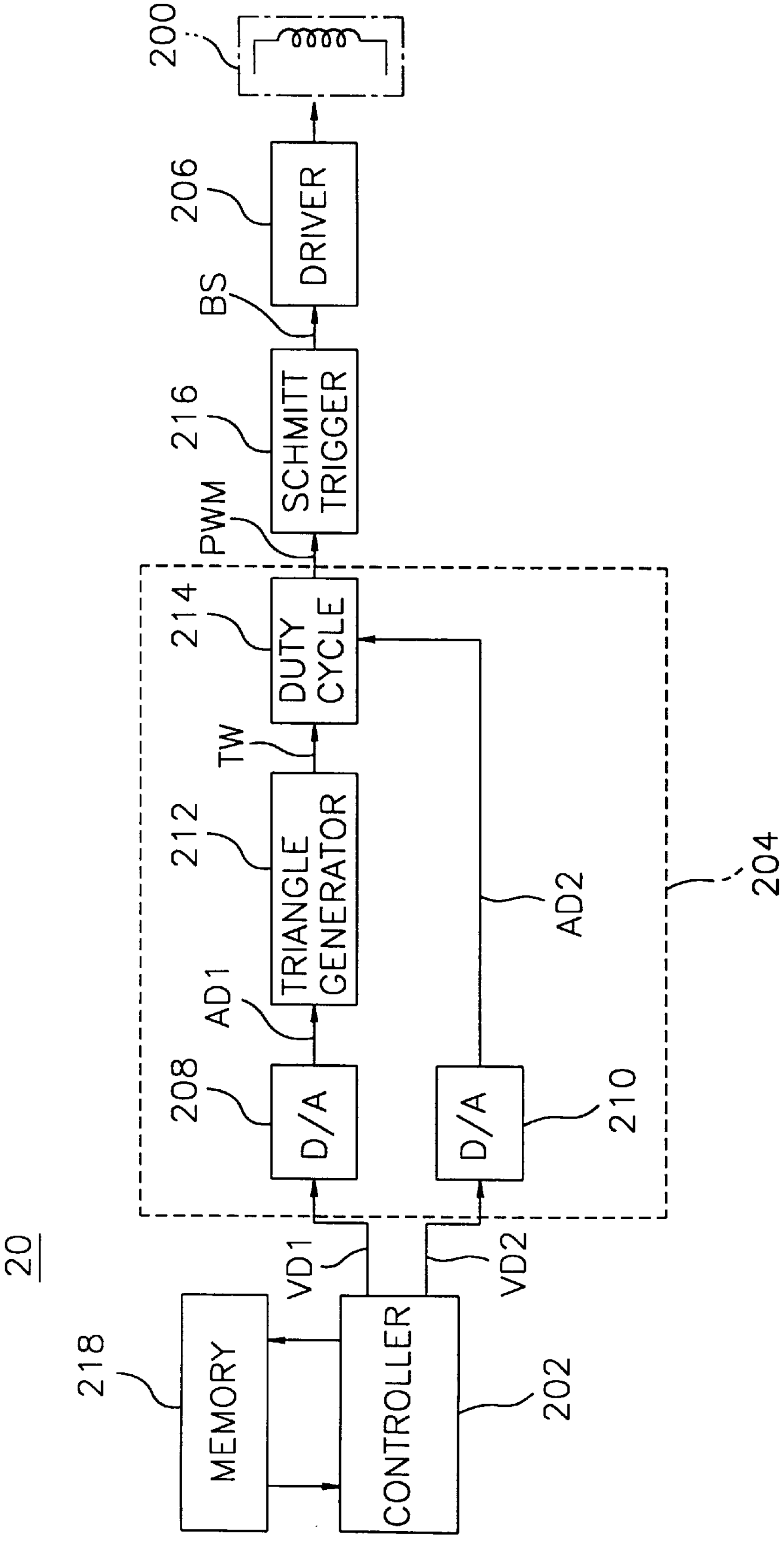
FIG. 2 is a block diagram for showing a configuration of a magnetostriction oscillator driving circuit according to an embodiment of the present invention.

FIG. 2 shows a configuration of a magnetostriction oscillator driving circuit 20 according to an embodiment of the present invention.

The magnetostriction oscillator driving circuit 20 includes a controller 202, a pulse width modulating circuit 204, and a driver 206.

The controller 202 outputs first and second variable digital signals VD1 and VD2 in order to control a duty cycle of a magnetostriction oscillator 200.

The pulse width modulating circuit 204 generates a variable pulse width modulating signal PWM based on the first and second variable digital signals VD1 and VD2 from the controller 202.

The pulse width modulating circuit 204 includes first and second digital/analog(D/A) converters 208 and 210, a triangle waveform generator 212, and a duty cycle controller 214.

The first D/A converter 208 converts the first variable digital signals VD1 from the controller 202 into a first variable analog direct current voltage AD1.

The second D/A converter 210 converts the second variable digital signal VD2 from the controller 202 into a second variable analog direct current voltage AD2.

The triangle waveform generator 212 generates a triangle waveform signal TW according to a level of the first analog direct voltage AD1 from the first D/A converter 208.

The duty cycle controller 214 receives the triangle waveform signal TW and the second variable analog direct voltage AD2 from the triangle waveform generator 212 and the second digital/analog converter, respectively, and outputs the pulse width modulating signal PWM based on the received triangle waveform signal TW and second analog direct voltage AD2.

Figure 3:
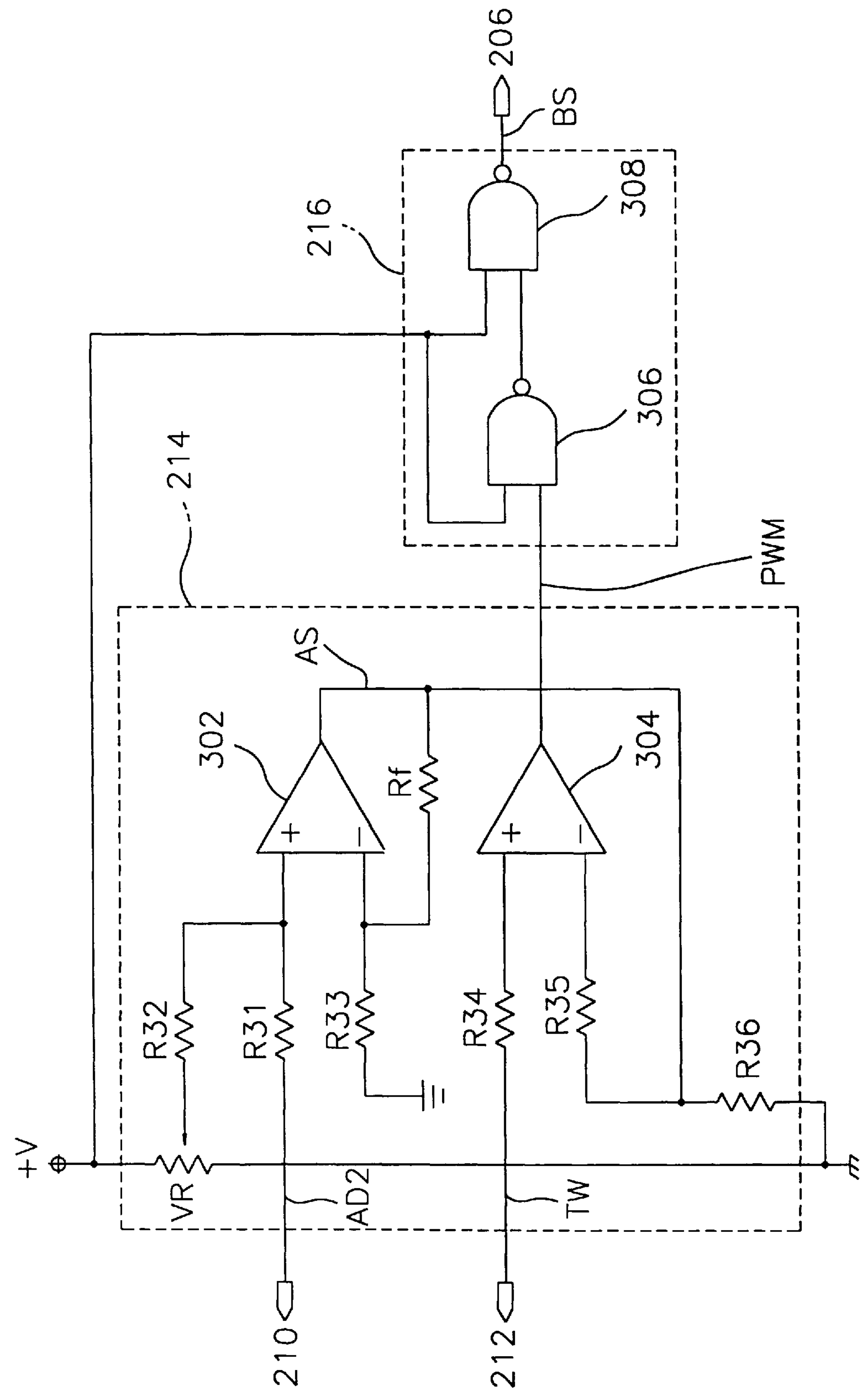
FIG. 3 is a circuitry diagram for showing one example of a duty cycle controller of a pulse width modulation circuit and a Schmitt trigger shown in FIG. 2.

FIG. 3 is a circuitry diagram for showing one example of a duty cycle controller 214 of the pulse width modulation circuit 204 and a Schmitt trigger 216 shown in FIG. 2.

The duty cycle controller includes an operational amplifier 302 and a comparator 304.

The operational amplifier 302 amplifies the second variable analog direct voltage AD2 from the second D/A converter 210 to output an amplified signal AS. A first resistor R31 is connected between an output terminal of the second D/A converter 210 and a noninverting input terminal of the operational amplifier 302. A variable resistor VR is connected to a power supply +V. A second resistor R32 is connected to a junction point of the first resistor R32 and the noninverting input terminal of the operational amplifier 302.

A third resistor R33 is connected between an inverting terminal of the operational amplifier 302 and a ground. A feedback resistor Rf is connected between a junction point of the third resistor R33 and the inverting input terminal of the operational amplifier 302 and an output terminal of the operational amplifier 302.

The comparator 304 compares the triangle waveform signal TW from the triangle waveform generator 212 with the amplified signal AS from the operational amplifier 302 to output the variable pulse width modulating signal PWM as a comparison result signal. A fourth resistor R34 is connected between an output terminal of the triangle waveform generator 212 and a noninverting input terminal of the comparator 304. Fifth and sixth resistors R35 and R36 are connected in series between the ground and an inverting input terminal of comparator 304. P junction point of the fifth and sixth resistors R35 and R36 is connected to a junction point of the feedback resistor Rf and the output terminal of the operational amplifier 302.

The magnetostriction oscillator driving circuit 20 further includes a Schmitt trigger 206 connected between the pulse width modulating circuit 210 and a driver 206 for buffering the variable pulse width modulating signal PWM from the pulse width modulating circuit 210. The Schmitt trigger 206 includes first and second NAND gates 306 and 308. The first NAND gate 306 includes a first input terminal connected to a power source +V, a second input terminal for receiving the variable pulse width modulating signal PWM from the duty cycle of the pulse width modulating circuit 214, and an output terminal. The second NAND gate 308 has a first input terminal connected to a junction point of the first input terminal of the first NAND gate 306 and the power source +V, a second input terminal connected to the output terminal of the first NAND gate 306, and an out terminal connected to an input terminal of the driver 206.

Figure 4:
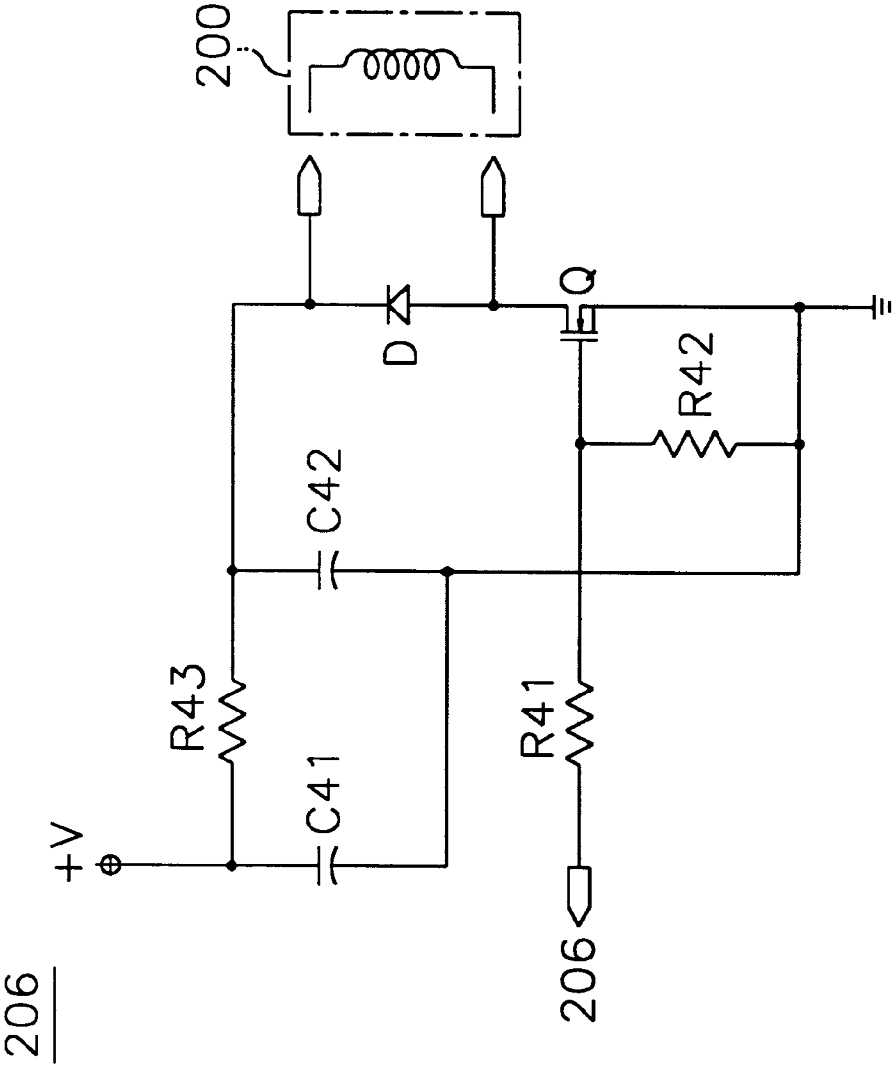
FIG. 4 is a circuitry diagram for showing one example of a driver shown in FIG. 2.

The driver 206 drives the magnetostriction oscillator 200 according to the variable pulse width modulating signal PWM from the pulse width modulating circuit 204. FIG. 4 is a circuitry diagram for showing one example of a driver 206 shown in FIG. 2. The driver 206 includes an n-channel field-effect transistor Q having a drain coupled to the magnetostriction oscillator 200, a gate for receiving the variable pulse width modulating signal PWM from the pulse width modulating circuit through the Schmitt trigger 216, and a source coupled to a ground. A resistor R41 is connected between the Schmitt trigger and the gate of the n-channel field-effect transistor Q. resistor R42 is connected between the gate and source of the n-channel field-effect transistor Q. A diode D is connected to junction point of the drain of n-channel field-effect transistor Q and the magnetostriction oscillator 200. Reference numeral R43 represents a resistor, and reference numerals C41 and C42 represent capacitors.

FIGS. 5A through 7C are timing charts for illustrating an operation of the magnetostriction oscillator driving circuit 20 shown in FIG. 2.

Figures 5A, 5B, 5C:
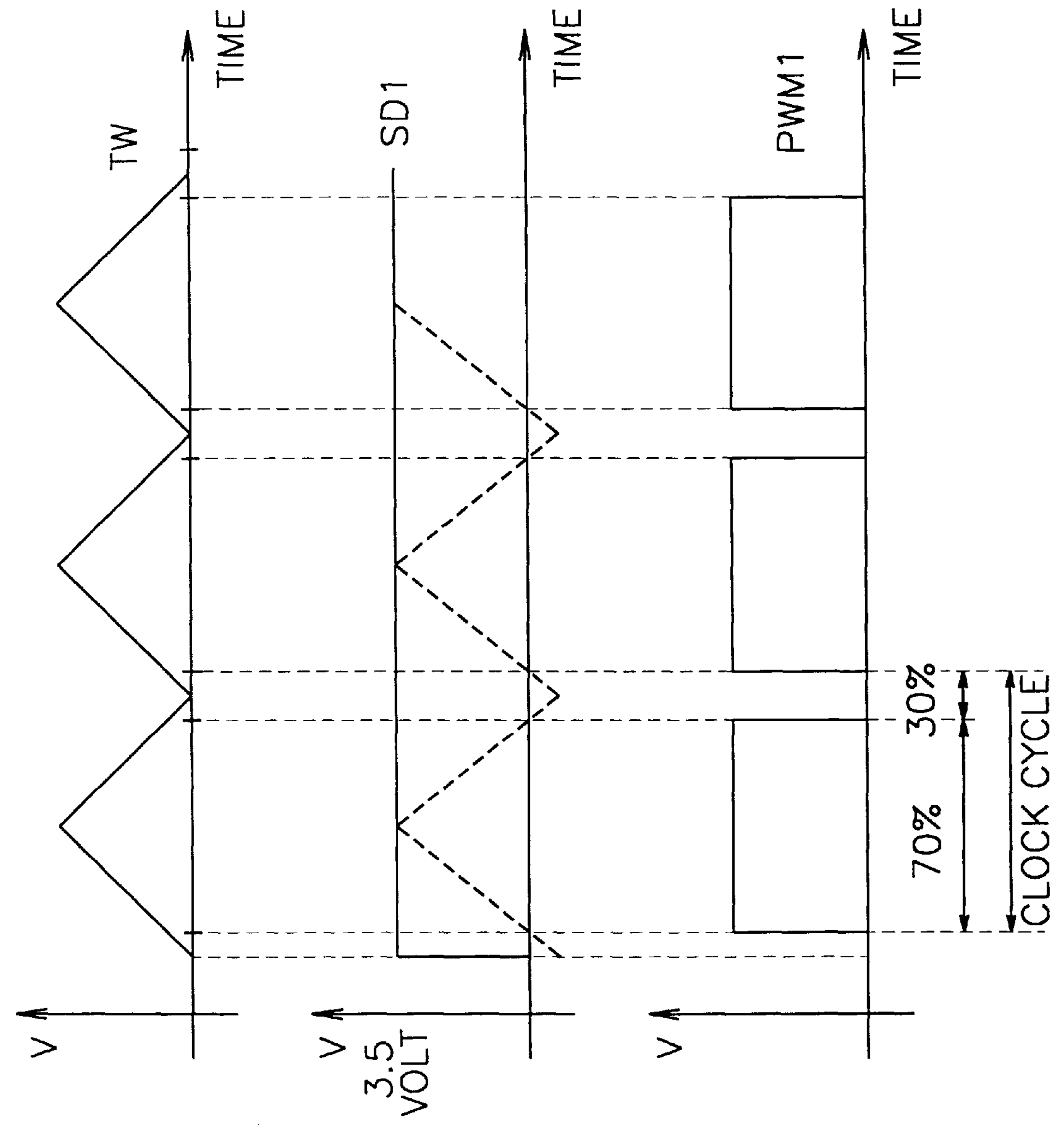

Referring to FIG. 5A, TW is a triangle waveform signal generated by the triangle waveform generator 212. Referring to FIG. 5B, SD1 is the second variable analog direct current voltage AD2 of 3.5 volts from the second D/A converter 210. Referring to FIG. 5C, PWM1 is a variable pulse width modulating signal of 70% duty cycle from the duty cycle controller 214 of the pulse width modulating circuit 204.

Figures 6A, 6B, 6C:
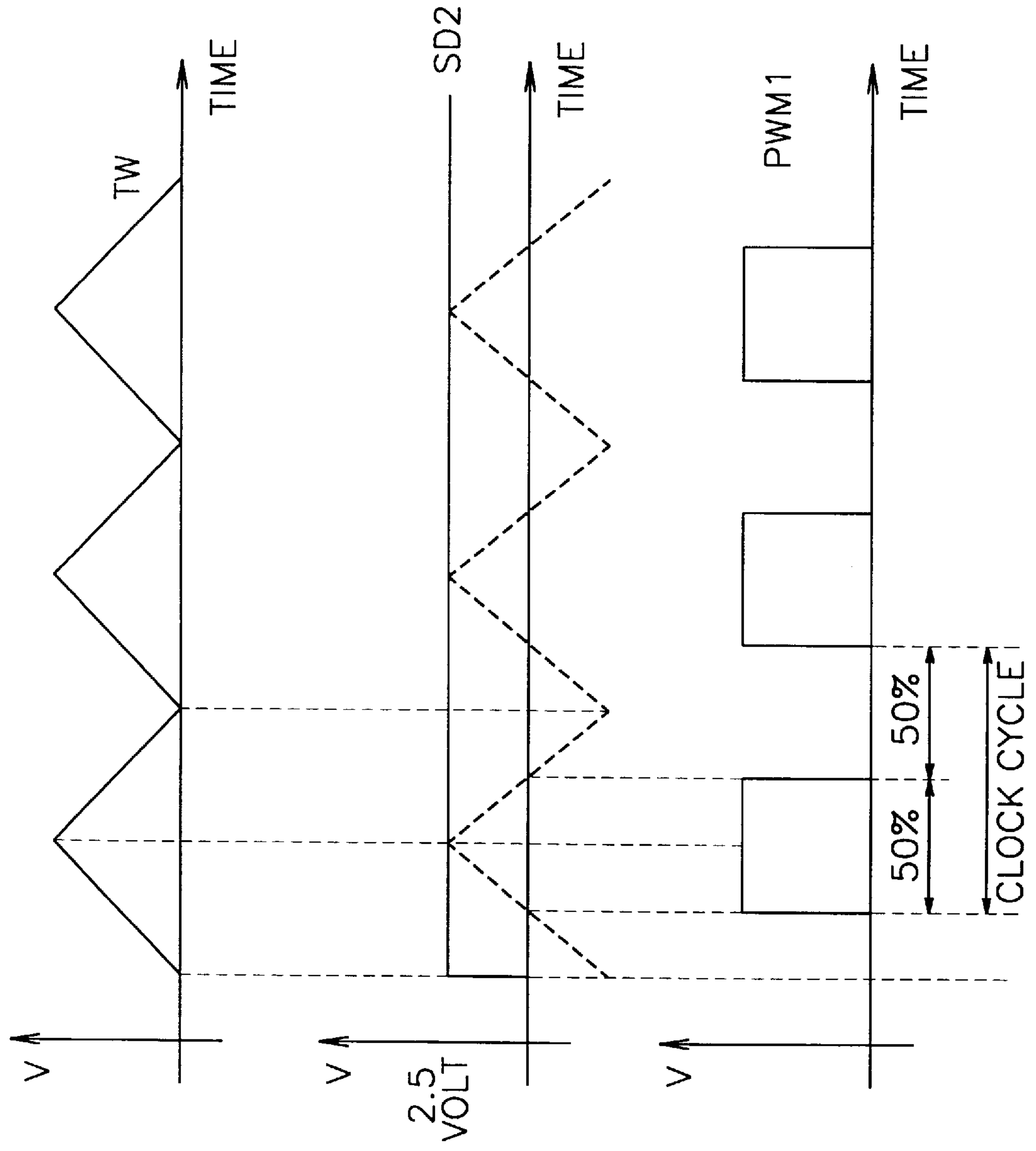

Referring to FIG. 6A, TW is the triangle waveform signal generated by the triangle waveform generator 212 as described FIG. 5A. Referring to FIG. 6B, SD2 is the second variable analog direct current of 2.5 volts from the second D/A converter 210. Referring to FIG. 6C, PWM2 is a variable pulse width modulating signal of 50% duty cycle from the duty cycle controller 214 of the pulse width modulating circuit 204.

Figure 7A:
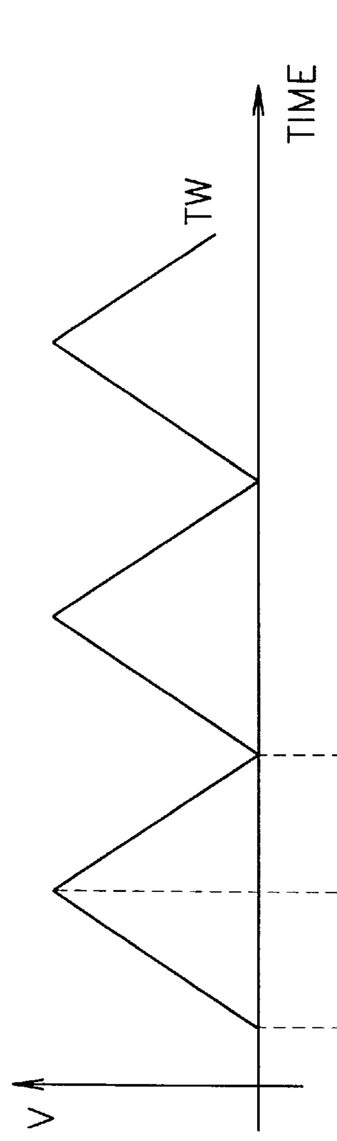
Figure 7B:
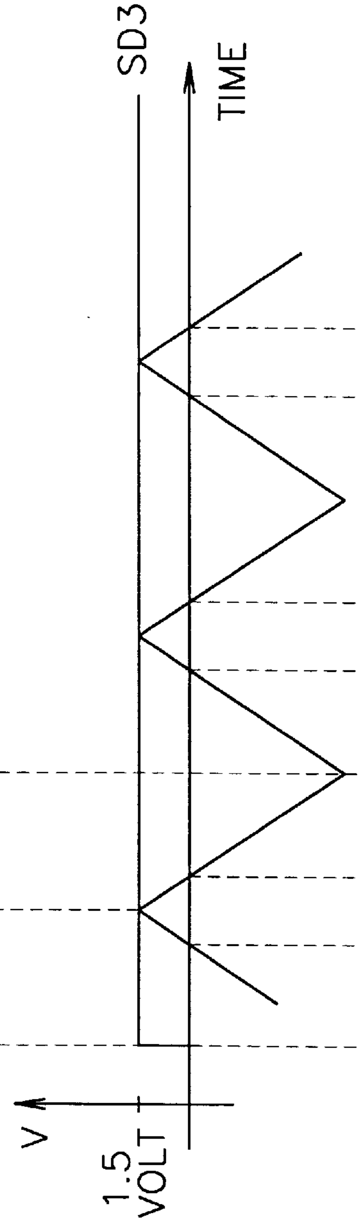
Figure 7C:
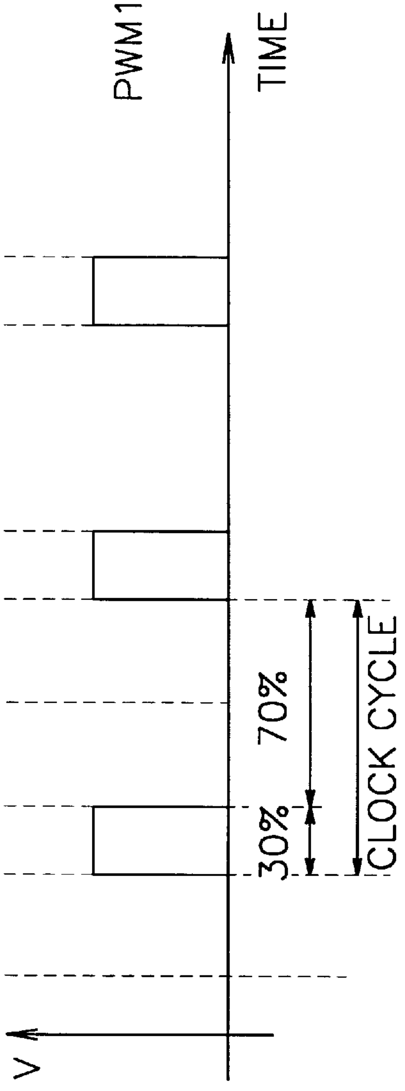

Referring to FIG. 7A, TW is the triangle waveform signal generated by the triangle waveform generator 212 as described in FIGS. 5A and 6A. Referring to FIG. 7B, SD3 is the second variable analog direct current voltage AD2 of 1.5 volts from the second digital/analog converter. Referring to FIG. 7C, PWM1 is a variable pulse width modulating signal of 30% duty cycle from the duty cycle controller 214 of the pulse width modulating circuit 204.

Hereinafter, an operation of the magnetostriction oscillator driving circuit 20 and a magnetostriction oscillator driving method according an embodiment of the present invention will be described referring to FIG. 8.

Figure 8:
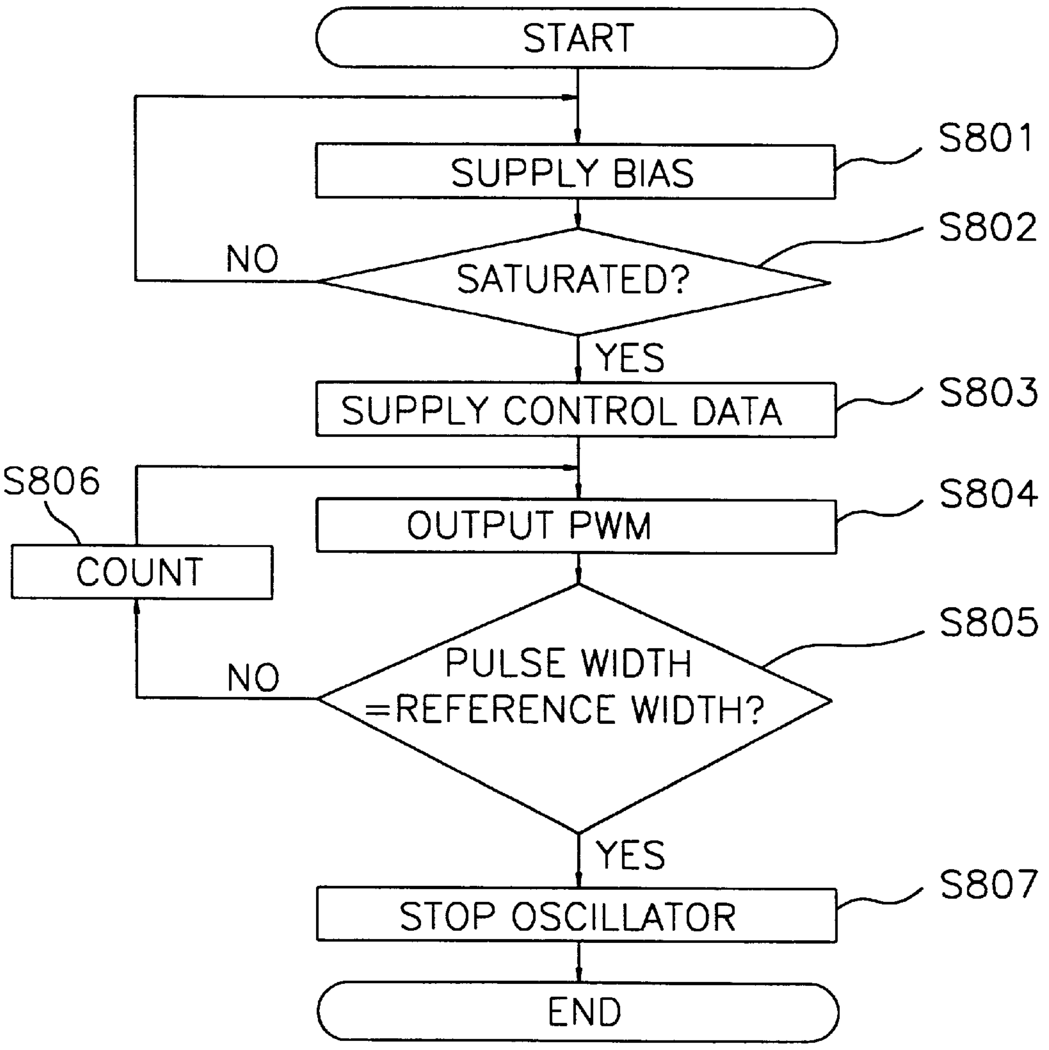
FIG. 8 is a flow chart for illustrating a magnetostriction oscillator driving method according to an embodiment of the present invention.

FIG. 8 is a flow chart for illustrating a magnetostriction oscillator driving method according to an embodiment of the present invention.

In step S801, the controller 202 supplies a bias current to a magnetostriction oscillator 200 to magnetically saturate the magnetostriction oscillator 200. In step S802, the controller 202 judges whether or not the magnetostriction oscillator 200 is magnetically saturated by supplying the bias current.

As a result of the judgement in step S802, when the magnetostriction oscillator 200 is not magnetically saturated, the routine returns to step S801. On the contrary, when it is judged in step S802 that the magnetostriction oscillator 200 is magnetically saturated, the controller 202 outputs control data for a pulse width modulation to the pulse width modulating circuit 204 (step S803). The control data includes first and second variable digital signals VD1 and VD2, and time data width respect to each duty cycle of the variable pulse width modulating signal PWM.

In step S804, the pulse width modulating circuit 204 outputs a variable pulse width modulating signal PWM based on the control data from the controller 202. After the magnetostriction oscillator 200 is magnetically saturated, a pulse width of the variable pulse width modulating signal from the pulse width modulating circuit becomes narrower as time passes. For example, the pulse width of the variable pulse width modulating signal PWM becomes gradually narrower from 70% duty to 30% duty cycle after 500 milliseconds.

In step S805, the controller 202 judges whether or not width pulse of the variable pulse width modulating signal is identical with a reference pulse width. In an embodiment of the present invention, the reference pulse width is preferably a pulse width of 30% duty cycle.

As a result of the judgement in step S805, when the width pulse of the variable pulse width modulating signal PWM is different from the reference pulse width, the controller 202 continues to count(step S806), and the routine returns to step S804. On the contrary, when it is judged in step S805 that the width pulse of the variable pulse width modulating signal is identical with the reference pulse width, the controller 202 stops the magnetostriction oscillator 200(step S808) and a total operation finishes.

According to the present invention, the system operates for a long time so that stability of equipment can be obtained. The present invention uses low voltage and low energy so that efficiency of the system is promoted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magnetostriction oscillator driving circuit, said circuit comprising:

a controller for outputting first and second variable digital signals in order to control a duty cycle of a magnetostriction oscillator;

a pulse width modulating circuit for generating a variable pulse width modulating signal based on the first and second variable digital signals from the controller; and a driver for driving the magnetostriction oscillator according to the variable pulse width modulating signal from the pulse width modulating circuit.

2. The driving circuit in accordance with claim 1, wherein after the magnetostriction oscillator is magnetically saturated, a pulse width of the variable pulse width modulating signal generated by the pulse width modulating circuit gradually becomes narrower as time passes.

3. The driving circuit in accordance with claim 1, wherein the pulse width modulating circuit includes first and second digital/analog converters for converting the first and second variable digital signals from the controller into first and second variable analog direct current voltages, respectively;

a triangle waveform generator for generating a triangle waveform signal according to a level of the first variable analog direct current voltage from the first digital/analog converter; and a duty cycle controller for outputting the variable pulse width modulating signal based on the second variable analog direct current voltage and the triangle waveform signal from the second digital/analog converter and the triangle waveform generator, respectively.

4. The driving circuit in accordance with claim 2, wherein the duty cycle controller includes an operational amplifier for amplifying the second variable analog direct voltage from the second digital/analog converter to output an amplified signal, and a comparator for comparing the triangle waveform signal from the triangle waveform generator with the amplified signal from the operational amplifier to output the variable pulse width modulating signal as a comparison result signal.

5. The driving circuit in accordance with claim 1, wherein the driver includes an n-channel field-effect transistor having a drain coupled to the magnetostriction oscillator, a gate for receiving the variable pulse width modulating signal from the pulse width modulating circuit, and a source coupled to a ground.

6. The driving circuit in accordance with claim 1, further comprising a Schmitt trigger connected between the pulse width modulating circuit and a driver for buffering the variable pulse width modulating signal from the pulse width modulating circuit.

7. The driving circuit in accordance with claim 1, further comprising a memory for storing control data for a pulse width modulation, wherein the control data includes time data with respect to each duty cycle of the variable pulse width modulating signal from the pulse width modulating circuit.

8. A magnetostriction oscillator driving method, said method the steps of:

(i) supplying a bias current to a magnetostriction oscillator to magnetically saturate the magnetostriction oscillator;

(ii) supplying control data for a pulse width modulation to the magnetically saturated magnetostriction oscillator;

(iii) outputting a variable pulse width modulating signal based on the control data supplied in step (ii);

(iv) judging whether the pulse width of the variable pulse width modulating signal is identical with a reference pulse width; and (v) controlling stopping of the magnetostriction oscillator according to the judgement result of step (iv).

* * * * *